United States Patent [19]

Traynor et al.

[11] Patent Number: 4,726,982
[45] Date of Patent: Feb. 23, 1988

[54] TACKIFIED ACRYLIC PRESSURE-SENSITIVE ADHESIVE AND COMPOSITE ARTICLE

[75] Inventors: William J. Traynor, Cottage Grove; Cheryl L. Moore, Afton; Michael K. Martin, Woodbury; John D. Moon, Hastings, all of Minn.

[73] Assignee: Minnesota Mining and Manufacturing Company, St. Paul, Minn.

[21] Appl. No.: 36,589

[22] Filed: Apr. 10, 1987

[51] Int. Cl.$^4$ ................ B32B 7/02; B32B 7/10; C08L 51/06
[52] U.S. Cl. ................ 428/213; 428/214; 428/317.3; 428/317.5; 428/317.7; 428/355; 524/272; 524/314
[58] Field of Search .............. 524/272, 314; 428/213, 428/214, 317.1, 317.3, 317.5, 317.7, 355

[56] References Cited

U.S. PATENT DOCUMENTS

| | | | |
|---|---|---|---|
| Re. 24,906 | 12/1960 | Ulrich | 526/328.5 |
| 3,681,190 | 8/1972 | Dahlquist | 428/356 |
| 4,223,067 | 9/1980 | Levens | 428/313.9 |
| 4,243,500 | 1/1981 | Glennon | 522/33 |
| 4,364,972 | 12/1982 | Moon | 427/54.1 |
| 4,456,741 | 6/1984 | Ames | 526/264 |
| 4,500,663 | 2/1985 | Hori et al. | 524/533 |
| 4,645,711 | 2/1987 | Winslow et al. | 428/355 |
| 4,656,213 | 4/1987 | Schlademan | 524/272 |

FOREIGN PATENT DOCUMENTS 0183368 6/1986 European Pat. Off. .

OTHER PUBLICATIONS

"American Paint and Coatings Journal", Mar. 18, 1985, pp. 54–58.

*Primary Examiner*—William J. van Balen
*Attorney, Agent, or Firm*—Donald M. Sell; James A. Smith; Richard Francis

[57] ABSTRACT

A pressure-sensitive adhesive that has high cohesive strength and adheres permanently to high-solids automotive paint systems preferably comprises a mixture of (1) a crosslinked acrylic copolymer of acrylic acid ester and N-vinyl-2-pyrrolidone, and (2) certain tackifier resins. Useful tackifier resins are poly(isobornylmethacrylate), pentaerythritol ester of rosin, and mixed-aliphatic/aromatic polymeric tackifier resins such as a t-butylated styrene. The tackifier resin preferably has a $T_g$ of at least 30° C., $M_n$ from 300 to 3000, and a solubility parameter from 8 to 9. The novel pressure-sensitive adhesive is particularly useful as a dense surface layer of a composite tape having a foamlike core.

17 Claims, No Drawings

TACKIFIED ACRYLIC PRESSURE-SENSITIVE ADHESIVE AND COMPOSITE ARTICLE

BACKGROUND OF THE INVENTION

1. Field of the Invention

The invention relates to pressure-sensitive adhesive and adhesive tape, especially a tape having a thick foam or foamlike core and a relatively thin, dense, pressure-sensitive adhesive surface layer which has been selected to provide improved adhesion to specific surfaces. The novel tapes are primarily useful for permanently attaching articles to automotive vehicles.

2. Description of the Related Art

Automotive body side molding usually is permanently mounted either by mechanical fasteners or by a pressure-sensitive adhesive tape having a thick foam or foamlike core and relatively thin pressure-sensitive adhesive surface layers. Among other uses for which pressure-sensitive adhesive tapes preferably have a foam or foamlike core are sealing skylights, attaching simulated mullion bars of glass windows, and attaching medallions to automotive vehicles.

An acrylic foamlike core is provided by a layer of acrylic pressure-sensitive adhesive in which are dispersed microbubbles as disclosed in U.S. Pat. No. 4,223,067 (Levens). The Levens patent uses ultraviolet radiation to polymerize the adhesive of its foamlike layer, but says that strong bonds to certain automotive paint surfaces can be attained only by pressure-sensitive adhesives which cannot be polymerized by ultraviolet radiation. In such event, it may be desirable to apply to one or both of its microbubble-filled faces a layer of unfilled pressure-sensitive adhesive selected for its adhesion to such surfaces. By having a thick foam or foamlike core, a pressure-sensitive adhesive tape better conforms to uneven surfaces.

U.S. Pat. No. 4,364,972 (Moon), which issued subsequent to the Levens patent, concerns an acrylic pressure-sensitive adhesive that can be polymerized by ultraviolet radiation and yet "adheres strongly to automotive paints and to rubber or plastic foam layers" (col. 2, lines 44-46). The Moon pressure-sensitive adhesive comprises a copolymer of acrylic acid ester of nontertiary alcohol and N-vinyl-2-pyrrolidone in an amount comprising from 15 to 50 parts by weight of the total monomers. The Moon pressure-sensitive adhesive has been used as a dense, unfilled surface layer of a composite tape having a foamlike core. Even though that surface layer adheres strongly to automotive paints that were in general use when the Moon patent was filed, automotive manufacturers have indicated that neither that composite tape nor any other pressure-sensitive adhesive tape on the market adheres as strongly as desired to the high-solids automotive paint systems that are coming into widespread use in order to reduce air pollution resulting from evolution of organic solvents into the atmosphere. For a discussion of high-solids automotive paint systems see "American Paint & Coatings Journal", Mar. 18, 1985, pages 54-58.

3. Other Related Art

Because the present invention employs tackifiers, attention is directed to prior teachings of the use of tackifiers in pressure-sensitive adhesive tapes. The earliest pressure-sensitive adhesive tapes were based on mixtures of rubbers and tackifier resins, and tapes employing these rubber-resin pressure-sensitive adhesives are still widely sold. One family of such tapes is disclosed in U.S. Pat. No. 3,681,190 (Dahlquist). Another class of pressure-sensitive adhesive tapes has been developed from polymers which require no tackifier resin, being inherently tacky and pressure-sensitive adhesive, as exemplified by copolymers of (a) acrylic acid ester of nontertiary alkyl alcohol and (b) copolymerizable monomer having a polar group such as acrylic acid. Such a pressure-sensitive adhesive is disclosed in U.S. Pat. Re. No. 24,906 (Ulrich) and is here sometimes called an "acrylic pressure-sensitive adhesive".

A large number of patents, which issued after the Ulrich patent, concern acrylic pressure-sensitive adhesive tapes, but most of them say nothing about tackifiers. One which does, U.S. Pat. No. 4,243,500 (Glennon), uses ultraviolet radiation to copolymerize a coating of a mixture of an unsaturated acrylate ester monomer, a thermoplastic tackifier resin, and an elastomer such as a non-crystallizing elastomeric block copolymer. Another is U.S. Pat. No. 4,500,683 (Hori et al.). A third patent that discloses an acrylic pressure-sensitive adhesive including tackifiers is U.S. Pat. No. 4,456,741 (Ames) in which the acrylic pressure-sensitive adhesive comprises a terpolymer of n-butyl acrylate, N-vinyl-2-pyrrolidone, and styrene. The Ames patent says that this pressure-sensitive adhesive terpolymer "may be used alone or in admixture with other materials such as polyterpenes" and then names several, all of which are tackifiers (col. 2, lines 47-53), but does not otherwise mention tackifiers. Neither does it mention any effect from employing a tackifier, and no tackifier is used in any of the examples. The Ames pressure-sensitive adhesive can be hot-melt coated without solvent, thus avoiding evolution of volatiles in the coating operation.

Also concerned with tackified acrylic pressure-sensitive adhesives is European patent application No. 85,307,696.6 (Publication No. 0,183,368, June 4, 1986) which specifically concerns pressure-sensitive adhesives that can be hot-melt coated without solvent.

U.S. Pat. No. 4,645,711 (Winslow et al.) discloses tackified acrylic pressure-sensitive adhesive tapes which are removable from automotive paint after paint baking and hence are useful as automotive masking tapes.

Except for the Winslow patent, none of the above citations in this "Other Related Art" section states that any of its pressure-sensitive adhesives would be useful by reason of providing enhanced adhesion to automotive paints or any other paints.

The above-cited Moon patent, which concerns pressure-sensitive adhesives designed especially to provide enhanced adhesion to automotive paints, teaches that tackifiers can be blended into the photoactive mixtures of monomers from which those pressure-sensitive adhesives are photopolymerized, but warns that "the addition of any such material adds complexity and hence expense to an otherwise simple, straightforward, economical process and is not preferred except to achieve specific results" (col. 6, lines 3-12). The Moon patent does not exemplify this teaching. However, the introduction of a tackifier into a photopolymerizable mixture of monomers often interferes with the polymerization and prevents the attainment of the desired adhesive and cohesive properties.

SUMMARY OF THE INVENTION

The invention provides what is believed to be the first pressure-sensitive adhesive that both has high cohesive strength and adheres permanently to high-solids automotive paint systems. The novel pressure-sensitive adhesive comprises by weight a blend of (1) an acrylic copolymer of monomers comprising:

(a) acrylic acid ester of nontertiary alkyl alcohol, the alkyl groups of which have an average of about 4 to 14 carbon atoms, said acrylic acid ester being per se polymerizable to a sticky, stretchable, elastic adhesive mass, and (b) N-vinyl-lactam in an amount comprising from 10 to 40 parts of the total monomers (a) and (b), and (2) tackifier resin selected from at least one of poly(isobornylmethacrylate), pentaerythritol ester of rosin and mixed-aliphatic/aromatic polymeric tackifier resin, and in an amount from about 5 to 50 parts per hundred parts of copolymer (1), said copolymer having a monomer conversion factor exceeding 95% and being crosslinked as evidenced by the adhesive having at least 50% gel in tetrahydrofuran (THF).

Useful N-vinyl-lactams include N-vinyl-2-pyrrolidone and N-vinyl-caprolactam, the former being preferred because it is less expensive and readily commercially available. Preferably, the monomer conversion factor is substantially 100% after the novel pressure-sensitive adhesive has been converted into a tape.

The gel fraction in THF may be determined by placing from 0.7 to 1.0 g of pressure-sensitive adhesive (PSA) in a 500 ml glass bottle, and adding 200 ml of tetrahydrofuran solvent to the bottle. The bottle is sealed and allowed to stand at room temperature for 12 hours. The contents of the bottle are filtered at the end of the 12-hour period through a porous glass filter funnel (ASTM 40–60 microns) using vacuum assist from an aspirator. The gel from the bottle is trapped on the porous glass filter. The filter is dried to constant weight in a circulating hot air oven. The filter containing the insoluble gel is cooled to room temperature and weighed.

Calculate the % gel content as follows:

$$\% \text{ gel} = \frac{CW - PW}{OW} \times 100$$

where

CW is the combined dry weight of the filter and insoluble PSA

PW is the weight of the clean filter

OW is the original weight of the PSA sample

Best adhesion to high-solids automotive paint systems has been attained when the tackifier resin is a mixed-aromatic/aliphatic homopolymeric or copolymeric resin. The aromatic content derived from $C_9$ monomer hydrocarbon fractions is described in Satas' *Handbook of Pressure Sensitive Adhesive Technology*, Van Nostrand Reinhold Co., New York, 1982, at pages 360–361. The aliphatic component usually is derived from $C_5$ or $(C_5)_2$ monomer fractions as described in Satas.

Examples of aliphatic $C_5$ or $(C_5)_2$ monomers in-vinyl toluene, p-methyl styrene, p-methoxy styrene, α-methyl styrene, tertiary-butyl styrene, n-butyl styrene, and 1,1-diphenylethylene.

Examples of aliphatic $C_5$ or (Chd 5)$_2$ monomers include: cis-piperylene, trans-piperylene, isoprene, 2-methyl-2-butene, pentene, pentadienes, hexadienes, cyclopentadiene, dicyclopentadiene, α-pinene, β-pinene and limonene.

The aromatic/aliphatic content can be adjusted by copolymerizing aliphatic monomers with aromatic monomers described above at various ratios. Furthermore, the copolymers can be hydrogenated to adjust the aromatic content and to lower the amount of tackifier resin unsaturation. Preferred mixed-aromatic/aliphatic polymeric resins include copolymers of styrene and alkylated styrene monomers, hydrogenated styrene/alkylated styrene copolymers, copolymers of alkylated styrene or styrene monomers with $C_5$ or $(C_5)_2$ aliphatic monomers such as cis- and/or trans-piperylene and/or terpene hydrocarbons like α-pinene and β-pinene, and hydrogenated copolymers of the same monomers. Preferred mixed-aromatic/aliphatic polymeric resins have from 90 to 20 wgt. % aromatic content and correspondingly from 10 to 80 wgt. % aliphatic content. More preferably the aromatic/aliphatic content should be about 50/50 by weight.

Preferably the $T_g$ of the tackifier resin should be at least 30° C., below which the pressure-sensitive adhesive might be deficient in cohesive strength, although a tackifier resin of lower $T_g$ can be employed in combination with an acrylic copolymer (1) which by itself is quite firm. When the acrylic copolymer (1) is quite soft, it may be desirable to employ a tackifier resin which has a $T_9$ substantially above 30° C.

Preferably the number average molecular weight ($M_n$) of the tackifier resin should be from 300 to 3000 as determined by gel permeation chromatography. Below 300 the pressure-sensitive adhesive might be deficient in cohesive strength, and above 3000 the pressure-sensitive adhesive might be undesirably firm. When the $M_n$ is outside of this preferred range, these deficiencies can be mitigated by employing an acrylic copolymer (1) which is respectively firmer or softer. The solubility parameter of the tackifier resin may be from about 7 to 9.5 $(cal/cm^3)$ but preferably is from about 8 to about 9 $(cal/cm^3)^{\frac{1}{2}}$. Outside of this preferred range, the tackifier resin may be less miscible with the copolymer (1).

Improved adhesion to high-solids automotive paint systems is attained with increased amounts of the tackifier resin (2) up to about 30 parts per 100 parts by weight of acrylic copolymer (1), above which amounts the adhesion tends to be lower. When the amount of tackifier resin (2) exceeds 30 parts, the amount of N-vinyl-lactam used in making the acrylic copolymer (1) preferably is kept at the lower end of the aforementioned 10–40 parts range.

When the N-vinyl-lactam comprises either less than about 10 parts or more than about 40 parts by weight of the total monomers (a) and (b) used in making the above-described acrylic copolymer (1), the novel pressure-sensitive adhesive tends to provide undesirably reduced improvement in adhesion to high-solids automotive paint systems. Best adhesion values can be expected when N-vinyl-lactam comprises from 20 to 25 parts by weight of the total monomers (a) and (b).

The tapes of the invention which best bond body side molding to high-solids automotive paint systems employ the novel pressure-sensitive adhesive as a dense surface layer on a foam or a foamlike core which is a pressure-sensitive adhesive matrix in which are dispersed microbubbles, preferably glass microbubbles, as disclosed in the above-cited Levens Pat. No. 4,223,067. The pressure-sensitive adhesive matrix of the foamlike core preferably is an acrylic pressure-sensitive adhesive comprising a copolymer of (a) acrylic acid ester of nontertiary alkyl alcohol and (b) copolymerizable monomer having a polar group, especially a carboxyl group which affords high cohesive strength, e.g., acrylic acid.

When a tape of the invention is a composite having a foamlike core, the core adheres best to body side molding when its pressure-sensitive adhesive matrix comprises an acrylic pressure-sensitive adhesive copolymer wherein monomer (b) is a carboxyl-containing monomer. However, to attain the strongest adhesion to body side molding, the composite tape should have a second, dense, pressure-sensitive adhesive surface layer that is specifically selected for its adhesion to the material of the body side molding. The pressure-sensitive adhesive of that second surface layer can be identical to that of the matrix of its foamlike core. Especially useful as the second surface layer are acrylic pressure-sensitive adhesives in which the copolymerizable monomer (b) has a carboxyl group such as acrylic acid, methacrylic acid, or itaconic acid. When the novel tape has a foamlike core with two dense surface layers, the surface layers may be pigmented to differ in appearance so that when used for mounting body side molding, the user will be sure to adhere the tackified copolymer layer to the painted surface. Preferably the thickness of the foamlike core is at least 0.3 mm, and that of each of the surface layers is no greater than 0.2 mm.

Instead of a foamlike core, a composite tape of the invention may have a core of foamed thermoplastic resin such as crosslinked polyethylene, polyurethane and polychloroprene foams, the latter being preferred because it has the highest cohesive strength. However, composite tapes of the invention, which have foam cores that are equal in cohesive strength to foamlike (microbubble-filled) cores, tend to have lower adhesive values than do those with foamlike cores, even when their surface layers are identical. This difference is attributed to the extraordinary ability of tapes having foamlike cores to conform to uneven surfaces.

Another foam which is useful as the core of a composite tape of the invention is a cellular pressure-sensitive adhesive as disclosed in U.S. Pat. No. 4,415,615 (Esmay et al.). However, such a cellular core tends to have lower cohesive strength than does a foamlike core.

The pressure-sensitive adhesive tapes of the invention are especially useful for adhering decorative and/or protective articles to automotive vehicles bearing high-solids automotive paint systems, thus making it unnecessary to employ mechanical fasteners. Useful decorative and/or protective articles include body side moldings, medallions, name plates, and weather strippings.

Breakaway/Continuous Peel Values

A 12.7 mm×200 mm pressure-sensitive adhesive transfer tape, carried on a release liner, is aligned squarely over the 15 mm×150 mm face of a rigid polyvinyl chloride test bar about 6 mm thick and pressed firmly into place by rolling once with a 6.8-kg roller. The liner is then removed from the tape, and the exposed adhesive surface aligned in the center of a freshly painted steel panel approximately 100 mm×300 mm, with one end of the test bar extending beyond the end of the panel. After rolling the test bar with a 6.8-kg (15-pound) roller at the rate of about 300 mm/minute to ensure good contact, the specimen is allowed to age for 72 hours at ambient temperatures, and then trimmed to a width of approximately 50 mm. The specimen is then clamped in a horizontal fixture mounted in the lower jaw of a tensile testing machine. A metal bar approximately 8 mm thick and having an opening at one end corresponding to the cross section of the vinyl test bar is slipped over the extended end of the test bar, and the opposite end gripped in the upper jaw of the tensile testing machine. The jaws are then separated at 30.5 cm/minute, noting both the force ("Breakaway Peel Value") required to initiate separation of the vinyl test bar from the painted panel and the force ("Continuous Peel Value") required to continue the separation until the bar is completely removed.

Automotive manufacturers are primarily interested in the Continuous Peel Value, because they have encountered the most problems when this value is low. We have found that any tape having a satisfactory Continuous Peel Value also has a satisfactory Breakaway Peel Value except when the breakaway has occurred due to cohesive failure of a foam or foamlike core.

180° Peel Value

The adhesive tape to be tested is slit to a width of 0.5 inch (1.27 cm) and is self-adhered to a freshly painted steel panel. This tape is subjected to the weight of a 2.0-kg hard-rubber-covered steel roller, 3 passes in each direction. After dwelling at ambient temperature (23° C.) for 20 minutes, the "180° Peel" is measured by moving the free end of the tape away from the painted panel at a rate of about 0.5 cm per second (using a tensile tester).

Static Shear Value

This test employs two 25.4-mm wide stainless steel straps, as follows: Type 304-2BA, 0.38 mm in thickness, surface roughness 0.05 micrometer arithmetic average deviation from the main line, washed with heptane. A 12.7-mm wide pressure-sensitive adhesive tape, carried on a release liner, is adhered to one end of a first of the straps and trimmed to a length of 25.4 mm. The liner is then removed, and the second strap adhered to the exposed adhesive surface. The specimen is placed in a horizontal position and rolled down with a 6.8-kg roller to ensure intimate contact between the surfaces. After dwell at room temperature for 24 hours, the assembly is placed in an air-circulating oven which has been preheated to 70° C. and after 15 minutes, a 250-g weight is hung from the free end of the tape, with the first strap tilted 2° from the vertical to insure against any peel forces. The time interval at which the weight falls is the "Static Shear Value". If no failure, the test is discontinued at 6,000 minutes. Only cohesive failures are reported.

Each of Tackifier Resins A–K is either poly(isobornylmethacrylate), pentaerythritol ester of rosin, or a mixed-aliphatic/aromatic polymeric tackifier resin.

Tackifier Resin A

Into a three-necked 500-ml flask fitted with a mechanical stirrer, dropping funnel and thermometer was placed cyclohexane (24.5 g) and $AlCl_3$ (0.6 g) in $N_2$ atmosphere. The flask was placed on an ice bath. A premix solution of styrene (59.5 g), cyclohexane (59.5 g) and anisole (4.5 g) was dropped from the dropping funnel into the stirred mixture in the flask over a fifteen-minute period. A thick orange-color solution was obtained. $AlCl_3$ (1.25 g) and t-butyl chloride (66.0 g) were added, the ice bath was removed, and the solution was heated to 40° C. for three hours. NMR spectral analysis revealed 49% alkylation. Additional $AlCl_3$ (1.0 g) was charged to the reaction mixture, and the mixture was heated at 40° C. for five hours. The reaction mixture was then quenched with $H_2O$, 200 ml of ether added, and the mixture was transferred to a separatory funnel.

The organic layer was washed three times with 5% NaOH solution and three times the water. The organic layer was dried with anhydrous MgSO4 and concentrated in water. The organic layer was dried with anhydrous MgSO4 and concentrated in vacuo. A solid residue was obtained which was dissolved in ethyl acetate and precipitated by adding methanol. A white solid was obtained [$T_g=65°$ C., $M_n=1,000$, and solubility parameter=8 to 8.5 (cal/cm$^3$)$^{\frac{1}{2}}$].

Tackifier Resins B–K

B=t-butylated poly(alpha-methylstyrene) $M_n=500$, $T_g=39°$ C. and solubility parameter=8–8.5 ["RES" TM D-295, Hercules]

C=t-butylated polystyrene $M_n=500$, $T_g=36°$ C. and solubility parameter=8–8.5 ["RES" TM D-296, Hercules]

D=poly(isobornylmethacrylate) prepared by free-radical polymerization, $M_n=1400$, $T_g=112°$ C.

E=homopolymer of t-butylstyrene prepared similarly to Tackifier Resin A except polymerized anionically, $M_n=1200$, $T_g=65°$ C., and solubility parameter=8

F=poly(alpha-methylstyrene), $T_g=42°$ C. and solubility parameter=9 ["Krystalex" TM 3085, Hercules]

G=styrene/vinyltoluene copolymer, $T_g=46°$ C. and solubility parameter=9.2 ["Piccotex" TM LC, Hercules]

H=pentaerythritol ester of rosin ["Permalyn" TM 105N, Hercules]

I=85/15 aromatic/aliphatic synthetic resin ["Nevpene" TM 9500, Neville Chemical Co.]

J=synthetic modified aromatic hydrocarbon believed to have more than 10 wgt. % aliphatic content ["Hercotac" TM RT-100S, Hercules]

K=synthetic modified aromatic hydrocarbon believed to have more than 10 wgt. % aliphatic content ["Hercotac" TM RT-115, Hercules]

The following examples employ materials as follows:

IOA=isooctyl acrylate
INA=isononyl acrylate
MA=methyl acrylate
MBA=2-methylbutyl acrylate
AA=acrylic acid
NVP=N-vinyl-2-pyrrolidone
NVC=N-vinyl-caprolactam
HEA=2-hydroxyethyl acrylate
ACM=acrylamide
XL-1=Photoactive s-triazine B of U.S. Pat. No. 4,391,687 (Vesley), col 7, line 20.
XL-2=acryloxybenzophenone
XL-3=polyfunctional aziridine ("CX-100", Polyvinyl Chemical Industries)
XL-4=polymethylene polyphenyl isocyanate ("PAPI" TM, Upjohn Polymer Chemicals)
XL-5=N,N'-bis-1,2-propyleneisophthalamide
In the examples, all parts are by weight.

EXAMPLE 1

A pressure-sensitive adhesive IOA/NVP 75/25 acrylic copolymer was made by the following procedure:

To a one-quart (1000-ml) narrow-mouthed glass bottle were added 135.0 g IOA, 45.0 g NVP, 0.36 g azobisisobutryonitrile ("Vazo" TM 64), and 220 g ethyl acetate. The solution was purged with one liter per minute nitrogen to eliminate oxygen. The sealed bottle was tumbled in a rotating water bath at 55° C. for 24 hours to effect complete polymerization. The copolymer was diluted to 25% solids with toluene. The diluted copolymer had a measured viscosity of 17,900 centipoises and a measured inherent viscosity of 1.63 deciliters/gram.

To 100 g of a 25%-solids solution of the copolymer in a clean glass bottle was added 5 g (i.e., 20 phr=parts per hundred copolymer), of pulverized Tackifier Resin A. After stirring with a metal spatula, this was allowed to stand overnight until the tackifier resin had dissolved in the solution. After stirring to insure uniform distribution of the tackifier, 0.8747 g of XL-1 was dissolved in 24.1273 g of toluene, and a portion of this solution was added to the bottle with stirring to provide 0.15% of the XL-1 based on total solids. This was stored in the dark to allow entrained air bubbles to clear.

The resulting composition was knife-coated onto a release paper, and the coating was dried in an oven to a thickness of about 0.05 mm. The dried tackified pressure-sensitive adhesive coating was irradiated with an exposure of 360 mJ/cm$^2$ ("Dynachem" TM Radiometer Model 500) from a bank of lamps, 90% of the emissions of which were between 300 and 400 nm with a maximum at 351 nm. By doing so, the tackified pressure-sensitive adhesive layer of this example became cross-linked, as evidenced by 70% gel in THF.

A portion of the pressure-sensitive adhesive layer of this transfer tape was transferred to a biaxially-oriented poly(ethylene terephthalate) polyester film backing 0.0375 mm in thickness, and another portion was transferred to a flexible polyurethane film backing 0.15 mm in thickness. The resulting tapes of the invention were tested in comparison to tapes having the same backings and layers of 90/10 IOA/AA pressure-sensitive adhesive copolymer, these comparison tapes being currently used by the automotive industry. The steel panels used in the tests had been painted with duPont RK-3840 basecoat/clearcoat high-solids automotive paint system.

| Adhesive | Backing | 180° Peel (N/100 mm) |
| --- | --- | --- |
| Example 1 | Polyester | 88 |
| Example 1 | Polyurethane | 88 |
| IOA/AA | Polyester | 53 |
| IOA/AA | Polyurethane | 63 |

EXAMPLE 2

The tape of Example 1 was used as a surface layer for a foamlike pressure-sensitive adhesive core which was made as taught in U.S. Pat. No. 4,330,590 (Vesley), from a mixture of 87.5 parts IOA, 12.5 parts AA, and 0.04 parts of 2,2-dimethoxy-2-phenyl acetophenone ("Irgacure" TM 651). To this syrup was added an additional 0.1 part of "Irgacure" TM 651 and 0.05 part of hexanedioldiacrylate, plus 8.0 parts of glass microbubbles which had an average diameter of 50 micrometers and a density of 0.15 g/cm$^3$. The thickness of the foamlike core was about 1.0 mm. A pressure-sensitive adhesive transfer tape was laminated to one surface of the core using a hard-rubber roller, which transfer tape was selected to provide good adhesion to the test bar in determining Breakaway/Continuous Peel Values, namely an acrylic pressure-sensitive adhesive copolymer in which copolymer monomer (b) is acrylic acid. The copolymer thickness was 0.05 mm.

The tackified pressure-sensitive adhesive transfer tape of Example 1 was laminated to the other surface of the core using a hard rubber roller. The resulting composite foamlike tape was slit with a razor blade into strips 0.5 inch (1.27 cm) wide for testing.

Strips of the composite foamlike tape of Example 2 were used to determine "Breakaway/Continuous Peel Values" with the tackified pressure-sensitive adhesive layer self-adhered to the painted steel plate. The following commercial high-solids automotive enamel paint systems were used:

I=duPont RK-3840 TM basecoat/clearcoat (acrylic)
II=duPont RK-3841 TM basecoat/clearcoat (flexible urethane)
III=Inmont M33J (acrylic)
IV=Inmont M33J 120 basecoat/clearcoat (acrylic)

Test results were:

| Paint System | Breakaway Peel Value (N/100 mm) | Continuous Peel Value (N/100 mm) |
|---|---|---|
| I | 1760 | 634 |
| II | 1408 | 493 |
| III | 1443 | 458 |
| IV | 1690 | 669 |

EXAMPLES 3–12

A number of composite foamlike tapes were made as in Example 2 except replacing the transfer tape of Example 1 with identical transfer tapes except that Tackifier Resin A was replaced by one of Tackifier Resins B-K (and omitted in the "Control"). Because the same pressure-sensitive adhesive copolymer was used in the tackified pressure-sensitive adhesive layer of each of these tapes and was crosslinked in the same manner, it is assumed that each pressure-sensitive adhesive had about 70% gel in THF. The tackifier-containing pressure-sensitive adhesive layer of each of these composite foamlike tapes was self adhered to a steel panel described above under "Breakaway/Continuous Peel Values" to which the duPont RK-3840 TM high-solids automotive paint system had been applied. Test results are tabulated below together with the result of testing the tape of Example 2.

COMPARATIVE EXAMPLES 13–19

A number of composite foamlike tapes were made as in Example 2 except replacing the transfer tape of Example 1 with identical transfer tapes except that Tackifier Resin A was replaced by one of Tackifier Resins L-R, each of which is not one of poly(isobornylmethacrylate), pentaerythritol ester of rosin, or a mixed aliphatic/aromatic polymeric tackifier resin and has not provided the objectives of the invention.

Tackifier Resins L-R

L=100% hydrogenated pure monomer resin, $T_g=80°$ C. ["Regalrez" TM 1126, Hercules]
M=100% hydrogenated pure monomer resin, $T_g=49°$ C. ["Regalrez" TM 1094, Hercules]
N=modified hydrogenated ester of glycerol ["RES" TM M-0282, Hercules]
O=poly-α-pinene resin, ring and ball softening point=135° C. ["Piccolyte" TM A-135, Hercules]
P=aromatic modified petroleum hydrocarbon resin which is believed to have 95/5 aliphatic/aromatic content ["Wingtack" TM Plus, Goodyear Chemicals]
Q=terpene phenol resin which is believed to have less than 20 wgt. % aromatic content ["Nirez" TM 2019, Reichhold Chemical Inc.]
R=resin based 100% on $C_9$ aromatic monomer ["Nevex" TM 100, Neville Chemical Co.]

Results of testing the composite tapes of Examples 2-12 and Comparative Examples 13-19 on high-solids automotive enamel paint system I are reported in Table I.

TABLE I

| Example | Tackifier Resin | Breakaway Peel Value N/100 mm | Continuous Peel Value N/100 mm | Static Shear Value (min.) |
|---|---|---|---|---|
| Control | None | 1760 | 420 | 6000+ |
| 2 | A | 1760 | 630 | 6000+ |
| 3 | B | 1650 | 630 | 6000+ |
| 4 | C | 1900 | 530 | 6000+ |
| 5 | D | 1650 | 630 | 6000+ |
| 6 | E | 1760 | 600 | NT |
| 7 | F | 1720 | 560 | 6000+ |
| 8 | G | 1830 | 560 | 6000+ |
| 9 | H | 1550 | 460 | 6000+ |
| 10 | I | 1865 | 495 | 6000+ |
| 11 | J | 1865 | 475 | 6000+ |
| 12 | K | 1865 | 530 | 6000+ |
| 13 | L | 1340 | 300 | NT |
| 14 | M | 1340 | 300 | NT |
| 15 | N | 1580 | 400 | NT |
| 16 | O | 1795 | 370 | 6000+ |
| 17 | P | 1230 | 140 | 6000+ |
| 18 | Q | 1585 | 210 | 6000+ |
| 19 | R | 1480 | 210 | 6000+ |

NT = not tested

EXAMPLE 20

A tranfer tape was made as in Example 1 except the crosslinking agent was XL-2 and was added to the solution prior to polymerization.

EXAMPLES 21–27

A number of transfer tapes were made as in Example 1 except that the monomers used in making the pressure-sensitive adhesive consisted of

| Example | |
|---|---|
| 21 | IOA/NVC 75/25 |
| 22 | IOA/MA/NVP 70/10/20 |
| 23 | INA/NVP 70/30 |
| 24 | IOA/NVP/ACM/HEA 75/22/3/1 |
| 25 | IOA/NVP/ACM 80/17/3 |
| 26 | MBA/NVP 77.5/22.5 |
| 27 | MBA/NVP 85/15 |

EXAMPLE 28

A transfer tape was made as in Example 1 except that (1) the monomers consisted of IOA/NVP/AA 75/22/3, (2) the amount of tackifier resin was reduced to 15 phr, (3) the crosslinker was changed to 0.05% XL-3, and (4) the radiation step was omitted.

EXAMPLE 29

A transfer tape was made as in Example 1 except that (1) the monomers consisted of IOA/NVP/HEA 75/22/3, (2) the crosslinker was changed to 0.05% of XL-4, and (3) the radiation step was omitted.

EXAMPLE 30

A transfer tape was made as in Example 1 except that (1) the monomers consisted of IOA/AA 95/5, (2) the crosslinker was changed to 0.05% XL-5, and (3) the radiation step was omitted.

EXAMPLE 31

A transfer tape was made as in Example 17 except that Tackifier Resin A was changed to Tackifier Resin D.

EXAMPLES 32–43

Composite tapes were made as in Example 2 except that the transfer tape of Example 1 was replaced by one of the transfer tapes of Example 20–31. Test results on high-solids automotive enamel paint system I are in Table II (the "Control" being the same as in Table I).

TABLE II

| Example (composite tape) | Employed Transfer Tape of Example | Breakaway Peel Value (N/100 mm) | Continuous Peel Value (N/100 mm) |
|---|---|---|---|
| Control | | 1760 | 420 |
| 32 | 20 | 1370 | 600 |
| 33 | 21 | 1760 | 475 |
| 34 | 22 | 1900 | 530 |
| 35 | 23 | 1690 | 530 |
| 36 | 24 | 1690 | 390 |
| 37 | 25 | 1865 | 140 |
| 38 | 26 | 1760 | 175 |
| 39 | 27 | 1900 | 420 |
| 40 | 28 | 910 | 100 |
| 41 | 29 | 1760 | 240 |
| 42 | 30 | 1300 | 260 |
| 43 | 31 | 1480 | 310 |

The composite tapes of Examples 36–43 have undesirably low adhesion to high-solids automotive paint systems. In examples 36, 37, 40 and 41, this is believed to have resulted from the deleterious effect of the additional monomers on the interaction between the tackifier resin and the NVP segments of the copolymer. In Examples 38 and 39, the copolymers of the transfer tapes were too firm at their level of tackifier resin. They could have been made less firm either by reducing the level of the tackifier resin or by lowering the proportion of NVP in the copolymer. The composite tapes of Examples 42 and 43 are comparative and illustrate that good adhesion to high-solids automotive paint systems cannot be attained when acrylic acid is substituted for NVP in making the acrylic copolymer.

EXAMPLES 44–46

Three composite tapes were prepared, that of Example 44 being identical to that of Example 2, and those of Examples 45 and 46 differing only in that the amount of XL-1 crosslinker used in making transfer tapes like that of Example 1 was reduced to 0.10% and 0.05%, respectively. Test results on high-solids automotive enamel paint system I are in Table III.

TABLE III

| Example | XL-1 Amount | Breakaway Peel Value (N/100 mm) | Continuous Peel Value (N/100 mm) | Static Shear Value (min.) | % Gel Content |
|---|---|---|---|---|---|
| 44 | 0.15% | 1720 | 600 | 6000+ | 70 |
| 45 | 0.10 | 1690 | 670 | 3000 | 66 |
| 46 | 0.05 | 1690 | 700 | 0 | 61 |

EXAMPLES 47–53

Seven composite tapes were prepared as in Example 2 except that the amount of Tackifier Resin A was changed in making transfer tapes like that of Example 1 to be used in the composite tapes. Hence, the composite tape of Example 50 is identical to that of Example 2. Table IV reports results of testing on high-solids automotive enamel paint system I.

TABLE IV

| Example | Tackifier Resin (phr) | Breakaway Peel Value (N/100 mm) | Continuous Peel Value (N/100 mm) |
|---|---|---|---|
| 47 | 5 | 1550 | 560 |
| 48 | 10 | 1620 | 530 |
| 49 | 15 | 1720 | 600 |
| 50 | 20 | 1760 | 600 |
| 51 | 25 | 1830 | 530 |
| 52 | 30 | 1830 | 530 |
| 53 | 35 | 1900 | 370 |

The composite tape of Example 53 illustrates that the use of relatively high proportions of the tackifier resin tends to make the pressure-sensitive adhesive more firm. This reduces adhesion to high-solids automotive paint systems unless the acrylic copolymer (1) is relatively soft or unless the $T_g$ of the tackifier resin is relatively low.

EXAMPLE 54

A strip of the transfer tape of Example 1 was laminated to a cellular acrylic foam core having a thickness of 1.0 mm and a density of 0.64 g/cm$^3$ that had been prepared as disclosed in U.S. Pat. No. 4,415,615 (Esmay et al.). The resulting laminate was tested in the same manner as in Example 2.

EXAMPLE 55

A strip of the tape of Example 1 was laminated to a foamed polychloroprene core (1.2 mm thick, 550 to 750 kg/m$^3$) and tested in the same manner as in Example 2.

Testing of the tapes of Examples 54–55 is reported in Table V.

TABLE V

| Example | Breakaway Peel Value N/100 mm | Continuous Peel Value (N/100 mm) | Static Shear Value (min.) |
|---|---|---|---|
| 54 | 915 | 420* | NT |
| 55 | 1230 | 460 | 6000+ |

*Failure in the cellular layer

We claim:
1. Pressure-sensitive adhesive comprising by weight a blend of (1) an acrylic copolymer of monomers comprising
    (a) acrylic acid ester of nontertiary alkyl alcohol, the alkyl groups of which have an average of about 4 to 14 carbon atoms, said acrylic acid ester being per se polymerizable to a sticky, stretchable, elastic adhesive mass, and
    (b) N-vinyl-lactam in an amount comprising from 10 to 40 parts of the total monomers (a) and (b), and
(2) tackifier resin selected from at least one of poly(isobornylmethacrylate), pentaerythritol ester of rosin, and mixed-aliphatic/aromatic polymeric tackifier resin and in an amount from about 5 to 50 parts per hundred parts of the acrylic copolymer (1), said copolymer having a monomer conversion factor exceeding 95% and being crosslinked as evidenced by at least 50% gel in THF, the tackifier resin enhancing permanent adhesion of the pressure-sensitive adhesive to high-solids automotive paint systems.

2. Pressure-sensitive adhesive as defined in claim 1 wherein said tackifier resin (2) has a $T_g$ of at least 30° C.

3. Pressure-sensitive adhesive as defined in claim 1 wherein said tackifier resin (2) has a $M_n$ from 300 to 3000.

4. Pressure-sensitive adhesive as defined in claim 1 wherein said tackifier resin (2) has a solubility parameter from 8 to 9 $(cal/cm^3)^{\frac{1}{2}}$.

5. Pressure-sensitive adhesive as defined in claim 4 wherein the tackifier resin has from 90 to 20 wgt. % aromatic content and correspondingly from 10 to 80 wgt. % aliphatic content.

6. Pressure-sensitive adhesive as defined in claim 1 wherein the N-vinyl-lactam comprises N-vinyl-2-pyrrolidone.

7. Pressure-sensitive adhesive as defined in claim 1 wherein the N-vinyl-lactam comprises N-vinyl-caprolactam.

8. Pressure-sensitive adhesive tape comprising a foam or foamlike core having a thickness of at least 0.3 mm and a dense, pressure-sensitive adhesive surface layer which is thinner than the core, the pressure-sensitive adhesive of the surface layer comprising a blend of (1) a copolymer of by weight
(a) acrylic acid ester of nontertiary alkyl alcohol, the alkyl groups of which have an average of about 4 to 14 carbon atoms, said acrylic acid ester being per se polymerizable to a sticky, stretchable, elastic adhesive mass, and
(b) at least one of N-vinyl-2-pyrrolidone and N-vinyl-caprolactam in an amount comprising from 10 to 40 parts of the total monomers (a) and (b), and (2) tackifier resin selected from at least one of poly(isobornylmethacrylate), pentaerythritol ester of rosin, and mixed-aliphatic/aromatic polymeric tackifier resin in an amount from about 5 to 50 parts per hundred parts of the copolymer (1), said copolymer having a monomer conversion factor exceeding 95% and being crosslinked as evidenced by at least 50% gel in THF, the tackifying resin enhancing permanent adhesion of the pressure-sensitive adhesive to high-solids automotive paint systems.

9. Pressure-sensitive adhesive tape as defined in claim 8 wherein the core is foamlike by comprising pressure-sensitive adhesive in which are dispersed microbubbles comprising from 5 to 65 volume percent of the core.

10. Pressure-sensitive adhesive tape as defined in claim 9 wherein the thickness of said dense, pressure-sensitive adhesive surface layer is no greater than 0.2 mm.

11. Pressure-sensitive adhesive tape as defined in claim 9 wherein the foamlike core is substantially free from voids other than the hollow spaces in the microbubbles.

12. Pressure-sensitive adhesive tape as defined in claim 8 wherein the core is a foam comprising a cellular pressure-sensitive adhesive.

13. Pressure-sensitive adhesive tape as defined in claim 8 wherein the core comprises a foamed thermoplastic resin.

14. Pressure-sensitive adhesive tape comprising a flexible backing carrying a layer of pressure-sensitive adhesive comprising a blend of (1) an acrylic copolymer of by weight
(a) acrylic acid ester of nontertiary alkyl alcohol, the alkyl groups of which have an average of about 4 to 14 carbon atoms, said acrylic acid ester being per se polymerizable to a sticky, stretchable, elastic adhesive mass, and
(b) N-vinyl-lactam in an amount comprising from 10 to 40 parts of the total monomers (a) and (b), and
(2) tackifier resin selected from at least one of poly(isobornylmethacrylate), pentaerythritol ester of rosin, and mixed-aliphatic/aromatic polymeric tackifier resin and in an amount from about 5 to 50 parts per hundred parts of the acrylic copolymer (1), said copolymer having a monomer conversion factor exceeding 95% and being crosslinked as evidenced by at least 50% gel in THF, the tackifier resin enhancing permanent adhesion of the pressure-sensitive adhesive to high-solids automotive paint systems.

15. Pressure-sensitive adhesive tape as defined in claim 14 wherein the N-vinyl-lactam comprises N-vinyl-2-pyrrolidone.

16. Decorative or protective article having a layer of pressure-sensitive adhesive comprising a blend of (1) an acrylic copolymer of by weight
(a) acrylic acid ester of nontertiary alkyl alcohol, the alkyl groups of which have an average of about 4 to 14 carbon atoms, said acrylic acid ester being per se polymerizable to a sticky, stretchable, elastic adhesive mass, and
(b) N-vinyl-lactam in an amount comprising from 10 to 40 parts of the total monomers (a) and (b), and
(2) tackifier resin selected from at least one of poly(isobornylmethacrylate), pentaerythritol ester of rosin, and mixed-aliphatic/aromatic polymeric tackifier resin and in an amount from about 5 to 50 parts per hundred parts of the acrylic copolymer (1), said copolymer having a monomer conversion factor exceeding 95% and being crosslinked as evidenced by at least 50% gel in THF, the tackifier resin enhancing permanent adhesion of the pressure-sensitive adhesive to high solids automotive paint systems.

17. Decorative or protective article as defined in claim 16 wherein the N-vinyl-lactam comprises N-vinyl-2-pyrrolidone.

* * * * *

UNITED STATES PATENT AND TRADEMARK OFFICE
CERTIFICATE OF CORRECTION

PATENT NO. : 4,726,982

DATED : February 23, 1988

INVENTOR(S) : Traynor et al

It is certified that error appears in the above-identified patent and that said Letters Patent is hereby corrected as shown below:

Column 3, line 57, delete "Examples of aliphatic $C_5$ or $(C_5)_2$ monomers in-" and insert in its place --Examples of aromatic $C_9$ monomers are: styrene,--.

Column 3, line 61, delete "(Chd 5)$_2$" and insert in its place --$(C_5)_2$--.

Signed and Sealed this

Thirteenth Day of December, 1988

Attest:

DONALD J. QUIGG

Attesting Officer

Commissioner of Patents and Trademarks